Nov. 8, 1960     A. A. H. KENLOCK ET AL     2,959,239
TRUCK CABS

Filed Sept. 10, 1956     3 Sheets-Sheet 1

Inventors
Albert Alexander Hobart Kenlock &
BY   John Harold Alden
J. E. Jones
Attorney

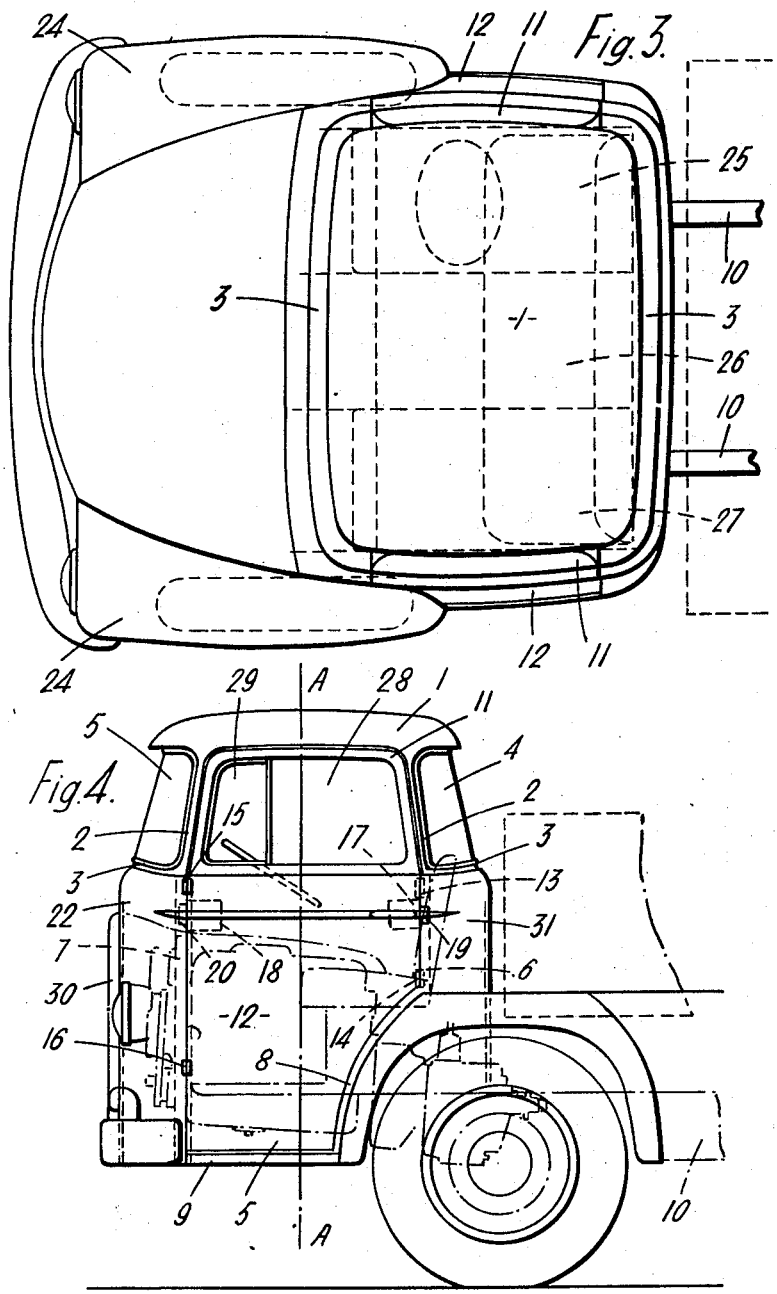

Nov. 8, 1960    A. A. H. KENLOCK ET AL    2,959,239
TRUCK CABS
Filed Sept. 10, 1956    3 Sheets-Sheet 3
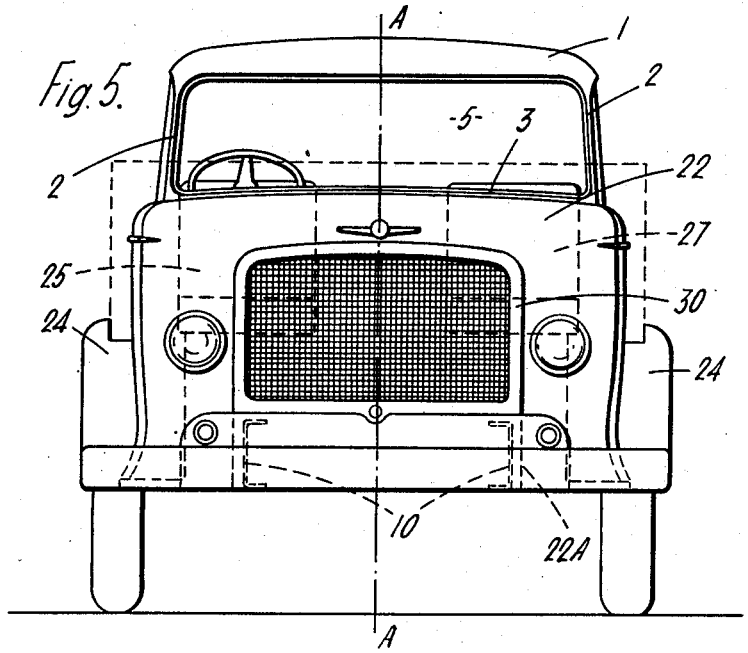
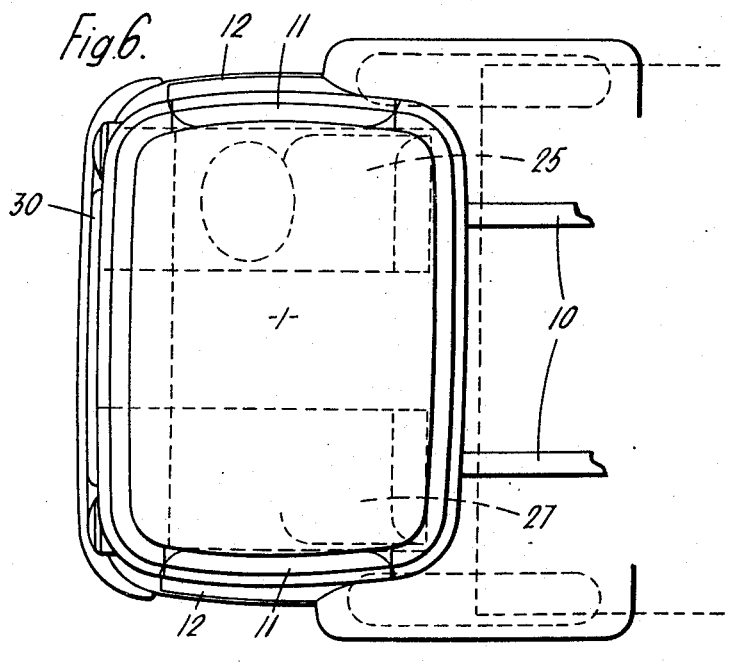
Inventors
Albert Alexander Hobart Kenlock &
BY  John Harold Alden
F. E. Jones
Attorney

United States Patent Office 2,959,239
Patented Nov. 8, 1960

2,959,239
TRUCK CABS

Albert A. H. Kenlock, Stoke Hammond, near Bletchley, and John H. Alden, Harpenden, England, assignors to General Motors Corporation, Detroit, Mich., a corporation of Delaware Filed Sept. 10, 1956, Ser. No. 608,874

Claims priority, application Great Britain Sept. 21, 1955

5 Claims. (Cl. 180—89)

This invention relates to truck cabs, and has for its object to facilitate manufacture of two different designs of vehicle by constructing certain components of the cab so that they are substantially the same for both designs.

The designs of vehicle in view are, firstly, one in which the driver sits behind the engine in a cab of which at least the greater part lies behind the front axle; and secondly, one in which the driver sits beside the engine in a cab of which at least the greater part lies above or forward of the front axle. The first design is hereinafter called a "normal control" truck, the second a "forward control" truck.

The basis of the invention is a cab superstructure which can be used in either design of vehicle, and by using which substantially the same door pressings can also be used in either design.

The expression "superstructure" herein means the part of the cab above the waistline.

The scope of the invention is defined by the appended claims; how the invention may be carried out is described below with reference to the accompanying drawings, in which:

Figure 3 is a plan view of the front end shown in Figures 1 and 2;

Figure 4 is a side elevation of the front end of a forward control truck;

Figure 5 is a front elevation of the front end shown in Figure 4; and

Figure 6 is a plan view of the front end shown in Figures 4 and 5.

Figure 1:
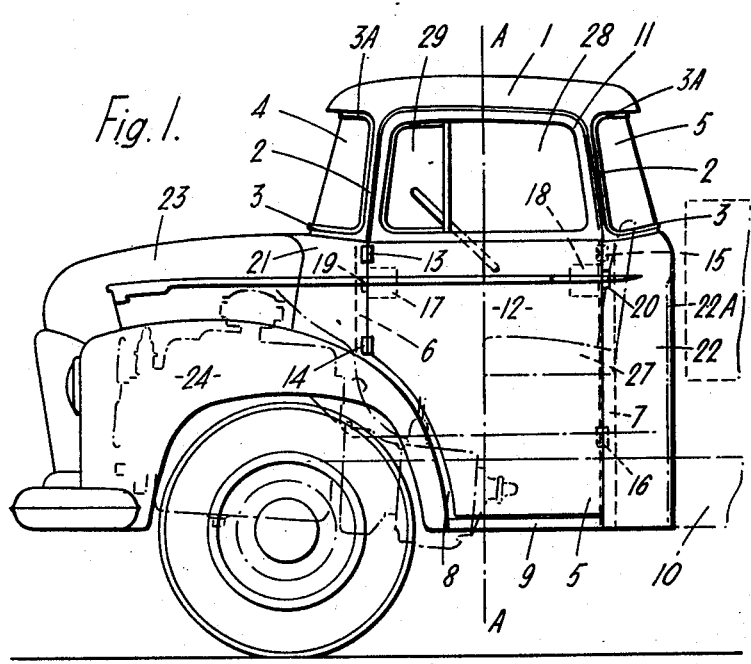
Figure 1 is a side elevation of the front end of a normal control truck.
Figure 2:
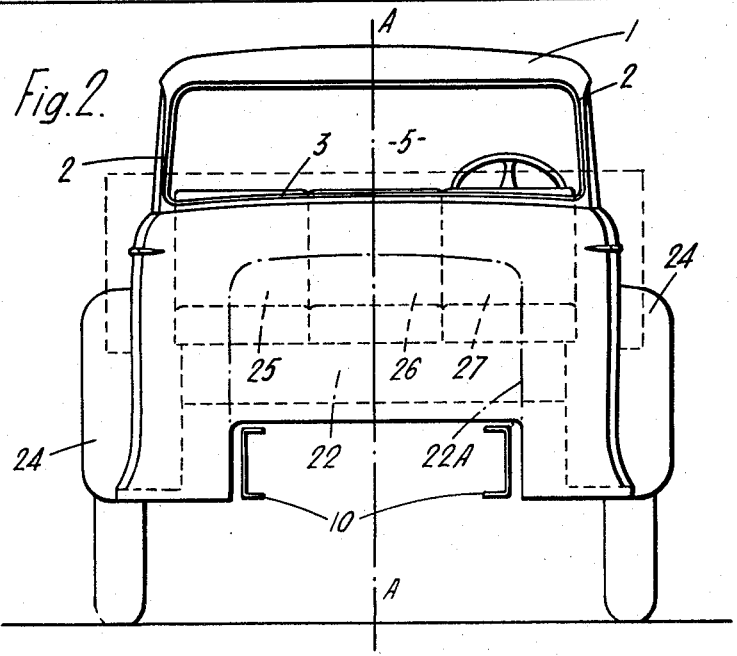
Figure 2 is a rear elevation of the front end shown in Figure 1.

Referring to the accompanying drawings, the superstructure of the truck cab shown in Figures 1 to 3 comprises a metal roof panel 1 from which extend two window frames which are identical in size and shape and each comprise side pillars 2 which are connected by a curved transverse member 3. The roof panel 1 is provided on the under-side with a formation which is of similar shape to the transverse member 3 at the bottom. Thus, each of the window frames is made up of the two side pillars 2, the bottom transverse member 3 and the upper transverse formation 3A; the whole frame being adapted to receive a glass pane.

As will be seen from Figure 3, the roof panel is symmetrical in plan. Since the two window frames are identical, and since they form the same angle with the roof panel, the entire superstructure is symmetrical about the central vertical axis indicated at A—A.

Each pair of side pillars 2 of the superstructure also forms the upper part of a door opening: and since as described above, the whole superstructure is symmetrical, it follows that the shape of the door opening above the waistline is symmetrical about a central vertical axis which coincides with the axis A—A. By the "waistline" is meant the level of the bottom of the windscreen and of the side windows.

The members 3 and 3A are curved as shown in Figure 3. One of the window frames has fitted in to it a windscreen pane 4, and the other frame has fitted in to it a rear light pane 5. These panes are of identical size and shape and each has curved ends, giving a "wrap round" effect.

The cab as a whole is built upon such main stress-bearing members as may be necessary, for example two longitudinal members and two cross-members, but the nature of this part of the structure is not relevant to the invention and is not described further.

The frame-work of the cab is continued on each side below the waistline by lower side pillars 6, 7 which continue the pillars 2 downwardly. The pillar 6 is shorter than the pillar 7, as shown in Figure 1. An arcuate member 8 forms a recess to receive the front wheel, and a horizontal bottom member 9 (which may be part of a main longitudinal member) connects the member 8 to the pillar 7. By mountings not shown the entire cab is mounted on chassis side members 10.

Each of the side doors is formed of a metal pressing having a window surround 11, and a panel portion 12.

Recesses or apertures for the fitting of hinges are formed in each of the lower door pillars 6, 7 and in the adjacent positions on each door edge, as indicated by the numerals, 13, 14, 15 and 16. Recesses or apertures for a door lock are provided at 17 and 18 at each edge of the door, and for the lock striker plate recesses are formed at 19 and 20 in the pillars 6 and 7.

In the normal control bodywork shown in Figures 1 to 3 the doors are hinged at their forward edges, the hinges being fitted in the recesses or apertures 13 and 14, while the recesses 15, 16 are unused and if necessary are blanked off. The door locks and the co-operating striker plates are fitted at 18 and 20; the recesses or apertures 17 and 19 are unused, and are blanked off if necessary.

A scuttle panel 21 is secured to the transverse member 3 and the pillars 6, and a rear panel 22 is secured to the rear transverse member 3 and to the pillars 7. The rear panel 22 has a central recessed portion 22A. An engine bonnet 23 and wings 24 complete the main items of the bodywork.

The seat structure inside the cab is formed in three sections, 25, 26 and 27, the centre section of which is removable.

Figures 4 to 6 of the drawings show the use of a superstructure as described above to construct a forward control cab, using the same door pressings. As before, the cab superstructure comprises a roof panel 1 and two identical window frames formed by the roof panel in conjunction with the side pillars 2 and the transverse member 3. The cab structure is also continued below the waistline in the same way as before: that is to say, it includes the lower pillars 6 and 7, the arcuate member 8 forming a wheel recess and the horizontal bottom member 9. As compared with Figures 1 to 3, the cab structure thus formed is turned around the other way so that the arcuate recesses 8 are now forward of the front wheels, and the windscreen indicated by 4 in Figure 1 becomes the rear light pane in the construction of Figure 4, while the rear light 5 now becomes the windscreen. As previously the lower part of the cab structure is built upon main stress-bearing members, for example longitudinal and cross members (not shown).

The door pressings used are the same as those used in the construction shown in Figure 1, but the locks and striker plates are transposed to the door edge adjacent the arcuate recess 8, and the hinges are transposed to the other edge of the door. Thus in this construction, the hinges are fitted in the recesses 15 and 16 while the recesses 13 and 14 are unused and if necessary are blanked-off. The locks and striker plates are mounted at 17 and 19 respectively while the recesses at 18 and 20 are unused and if necessary blanked off.

The side windows, which are made up of a pivotable ventilator 29 and a vertically-slidable "drop" portion 28 are the same for both the normal control cab and the forward control cab; and in changing from one to the other the window assemblies need only be changed from one side of the vehicle to the other.

In mass production operations it would probably be convenient to deliver the doors to the assembly point with the locks and the window assemblies in the positions required by the type of bodywork under construction, with the unused recesses or apertures already blanked-off if necessary.

In the forward control cab the central seat portion 26 is removed to receive the engine casing.

The forward control cab has a front panel 22 which is the same size and shape as the rear panel 22 described with reference to Figure 1, but the recessed portion 22A is removed to provide a space for the radiator grille 30. A special rear panel 31 is attached by welding to the transverse member 3 and to the lower pillars 6, and other parts which are special to the forward control cab are attached, for example the wings and the headlamps.

We claim:

1. A truck cab of pressed metal parts which above the waistline has a superstructure comprising a roof panel having extending from it front and rear window frames having side pillars which form on each side the upper part of a door opening, said superstructure being symmetrical about a central vertical axis; said cab on each side below the waistline comprising lower pillars continuing downwardly said window frame pillars and defining the lower part of a door opening, one of said lower pillars being shorter than the other; said door opening being completed at the bottom by an arcuate member which forms a road-wheel recess and has its upper end running from the bottom of said shorter pillar, and by a horizontal member which joins the longer one of the said lower pillars to said arcuate member.

2. A cab according to claim 1, wherein on each side the side pillars of the superstructure diverge from each other in the downward direction as far as the waistline.

3. A truck cab according to claim 1, having a bonnet scuttle structure attached at the base of that window frame which is nearer said wheel recess, and which serves as a windscreen frame, and having a rear panel attached at the base of the other window frame, which frame thereby serves as a rear light frame.

4. A truck cab according to claim 1, having a front panel attached at the base of that window frame which is farther from said wheel-recess, and which serves as a windscreen frame, and having a rear panel attached at the base of the other window frame, which serves as a rear light frame.

5. A truck cab for use as either a forward control truck cab or a cab over engine truck cab by turning said cab around from front to rear comprising, a cab superstructure symmetrical about a central vertical axis above the cab belt line and including, a roof panel symmetrical about said central axis, a pillar depending from said panel at each of the four corners thereof, said pillars being arranged in symmetrical pairs about said central axis and defining with said roof panel four openings, two of said openings being located opposite to each other symmetrical about said central axis and of substantially the same size and shape to provide front and rear window openings, the other two of said openings also being located opposite to each other symmetrical about said axis and of substantially the same size and shape to define the upper part of door openings located at each side of said superstructure, said entire superstructure being symmetrical about said axis whereby it may be turned around from front to rear depending on whether used with a forward control truck cab or a cab over engine truck cab; said cab further including pillars extending downwardly from each of said pillars below the belt line thereof; and structural members joining the pillars on each of the sides of said roof panel to define the lower part of each of said door openings; two of said structural members being shaped to provide an offset corner for each of said openings to accommodate a wheel of the truck whereby the portion of said cab below the belt line thereof is symmetrical about a longitudinal center axis, said offset openings accommodating the front wheels of the truck when the cab is used as a forward control truck cab, and accommodating the rear wheels of the truck when the cab is used as a cab over engine truck cab.

References Cited in the file of this patent

UNITED STATES PATENTS

| D. 159,913 | Macdonald | Aug. 29, 1950 |
| D. 162,116 | Barton | Feb. 27, 1951 |
| 1,689,765 | Baxter | Oct. 30, 1928 |
| 2,154,011 | Reinoehl | Apr. 11, 1939 |
| 2,174,267 | Jeffries | Sept. 26, 1939 |

FOREIGN PATENTS

| 141,339 | Sweden | July 21, 1953 |

OTHER REFERENCES

"Wards All-Weather Tractor Cabs," from Montgomery Ward & Co. Farm Equipment Catalog, Fall Supplement of 1948, page 37.